United States Patent [19]

Frische

[11] Patent Number: 5,142,912

[45] Date of Patent: Sep. 1, 1992

[54] SEMICONDUCTOR PRESSURE SENSOR

[75] Inventor: Richard H. Frische, Phoenix, Ariz.

[73] Assignee: Honeywell Inc., Minneapolis, Minn.

[21] Appl. No.: 538,956

[22] Filed: Jun. 15, 1990

[51] Int. Cl.[5] .............................................. G01L 9/06
[52] U.S. Cl. ...................................... 73/702; 73/727;
338/4; 338/42
[58] Field of Search ................ 73/702, 727, 726, 754,
73/DIG. 4, 704; 338/4, 42

[56] References Cited

U.S. PATENT DOCUMENTS

| | | | |
|---|---|---|---|
| 3,456,508 | 7/1969 | Frische | 73/702 |
| 4,098,133 | 7/1978 | Frische et al. | 73/702 |
| 4,764,244 | 8/1988 | Chitty et al. | 73/DIG. 4 |
| 4,825,335 | 4/1989 | Wilner | 361/283 |

Primary Examiner—Donald O. Woodiel
Attorney, Agent, or Firm—John G. Shudy, Jr.

[57] ABSTRACT

Pressure sensor having a silicon diaphragm chip. The diaphragm in the chip is less than 200 mils in diameter and has an ultrasonic resonant frequency that varies with pressure exerted on it. The chip has resistors with values that change with fluctuation of the chip. The changing resistor values are fed to a supporting electronics that detect the resonant frequency of the diaphragm and indicate measurement of the pressure exerted on the diaphragm. The supporting electronics feed back a signal corresponding to the detected resonant frequency for a sensed pressure to a piezoelectric device that drives the diaphragm to sustain its vibration.

11 Claims, 6 Drawing Sheets

A-A

A-A

SEMICONDUCTOR PRESSURE SENSOR

The present invention pertains to sensors and particularly to air data sensors. More particularly, the invention pertains to gas pressure sensors.

BACKGROUND OF THE INVENTION

There are several pressure sensor technologies in the related art. Two of the most significant technologies are those of silicon transducer and the resonant element sensors. The silicon transducer has weaknesses of inherent analog output, small output variation, complex and sophisticated electronics, large temperature sensitivity, thermal hysteresis and poor control of subtle manufacturing processes that affect performance. The resonant element, such as the beryllium copper diaphragm, has the weaknesses of costly diaphragm construction, significant acceleration sensitivity, metallic diaphragm, history sensitivity and significant packaging bulkiness. The analog systems of the related art involved low level signals which need to be very precise. The present invention effectively avoids the disadvantages of the existing pressure sensor technologies.

SUMMARY OF THE INVENTION

The invention has a resonant semiconductor diaphragm which is incorporated in a monolithic chip design. The diaphragm has a varying resonant mode frequency corresponding to varying pressure loads. The chip has resistors with values sensitive to diaphragm vibrations. The resistor values are determined by supporting electronics which measure the value changes to indicate frequency and corresponding sensed pressures on the diaphragm. The frequency of the resistor value changes is fed back to a piezoelectric driver that reinforces the diaphragm vibrations. The diaphragm is attached to a silicon backplate. The present invention is excellent for digital air data and engine pressure ratio systems. Analog errors present in the related art systems are eliminated with the present invention. Also, the invention has a much smaller vibrating element pressure sensor and a reduced gravity sensitivity than that of the related art. The related art has diaphragms of typically one inch in diameter. The present embodiment of the invention uses a diaphragm of about 140 mils in diameter and 1.5 mils thick. However, the invention may incorporate different-sized components and other kinds of materials, The related art depends on the mechanical properties of the diaphragm whereas the invention utilizes both the mechanical and electrical properties of a silicon diaphragm. The temperature sensitivity of the invention is small. The supporting electronics is elegantly simple.

DESCRIPTION OF THE PREFERRED EMBODIMENT

Figure 1:
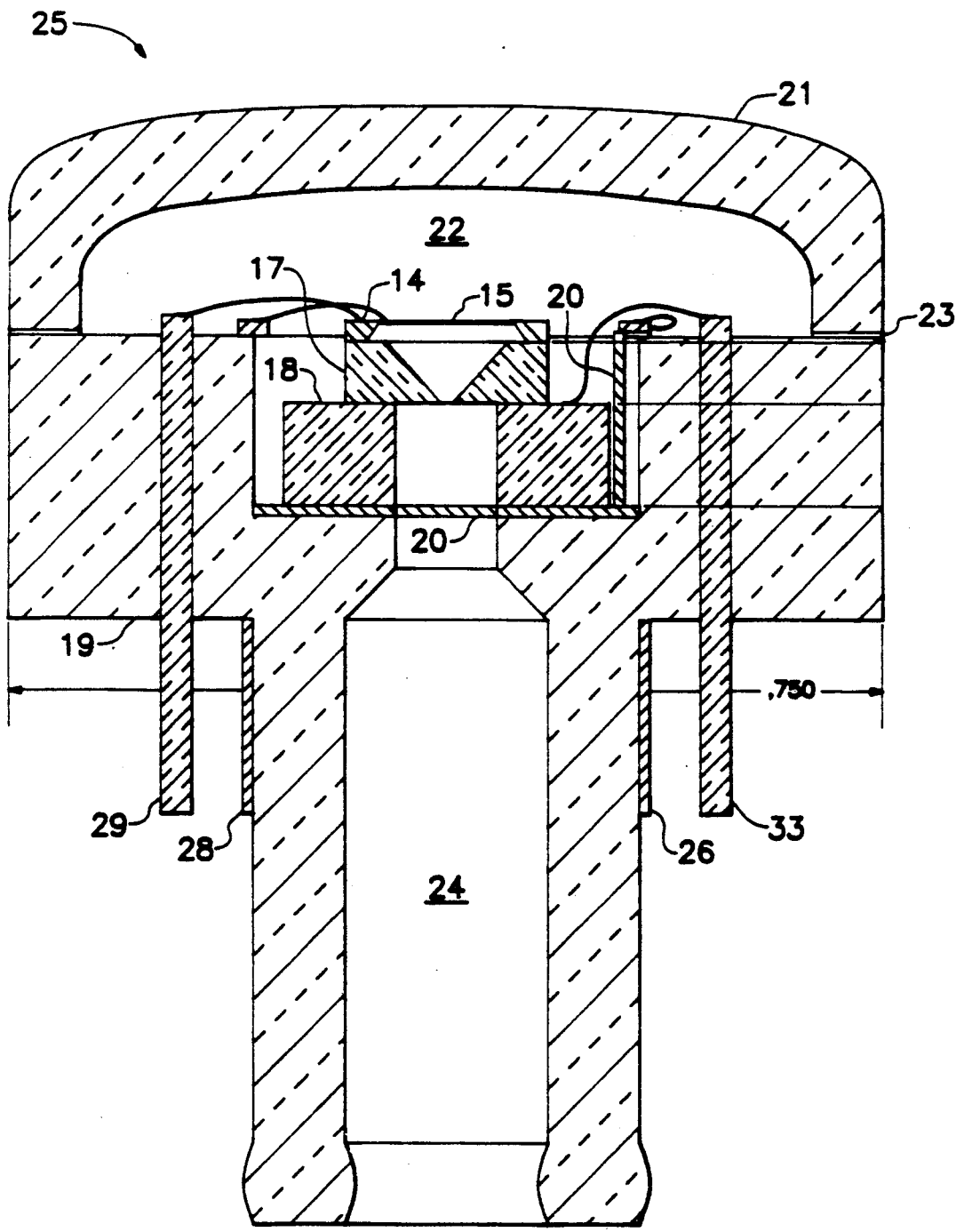
FIG. 1 is a sectional side-view of the silicon pressure sensor.

The present invention incorporates a mechanical resonance silicon pressure sensor 25 which (FIGS. 1 and 2) utilizes a silicon diaphragm chip 14 design which is calculated to have a fundamental resonant mode frequency variation of 48,000 to 58,000 hertz for pressure loads of zero to one atmosphere. The 10,000 hertz difference is a substantial output variation for the one atmosphere range. Because of the excellent mechanical properties of crystalline silicon, proven by its extensive pressure hysteresis, the resonance of diaphragm 15 (FIG. 3) has a high Q and provides the basis for a very stable oscillator. Bridge circuitry 35 (FIG. 4) having resistors 16 with a value of about 10,000 ohms each, implanted in chip 14 functions as a strain gauge and provides an adequate means for detecting the diaphragm's resonant displacements. Diaphragm chip 14 is thermally bonded to silicon back plate 17 (FIG. 1) with an orifice. Silicon back plate 17 is frit bonded to piezoelectric ceramic 18 which is an ultrasonic transducer 18. Piezoelectric ceramic (PZT) 18 is attached to a borosilicate glass or ceramic header 19 with an electrically conducting film 20 between piezoelectric ceramic 18 and header 19. Backplate 17 functions as a stress isolator for diaphragm 15. Borosilicate glass header 19 is made with standard fabrication techniques. Film 20 provides electrical continuity between the bottom of ceramic device 18 and the top surface of header 19 (in FIGS. 1 and 2). Backplate 17, ceramic 18 and header 19 have thermal coefficients that match the thermal expansion coefficient of silicon chip 14 which incorporates diaphragm 15. A borosilicate or ceramic cover 21 is designed to enclose volume 22 which is a vacuum chamber between header 19 and cover 21. Cover 21 is attached to header 19 with a gold/germanium bond 23. Cover 21 also has a thermal expansion coefficient that matches the like coefficient of silicon chip 14. Header 19 has a pressure port 24 leading from the external environment for conveyance of environmental pressures to diaphragm 15 to be sensed for ultimate measurement of pressure magnitude.

Figure 2:
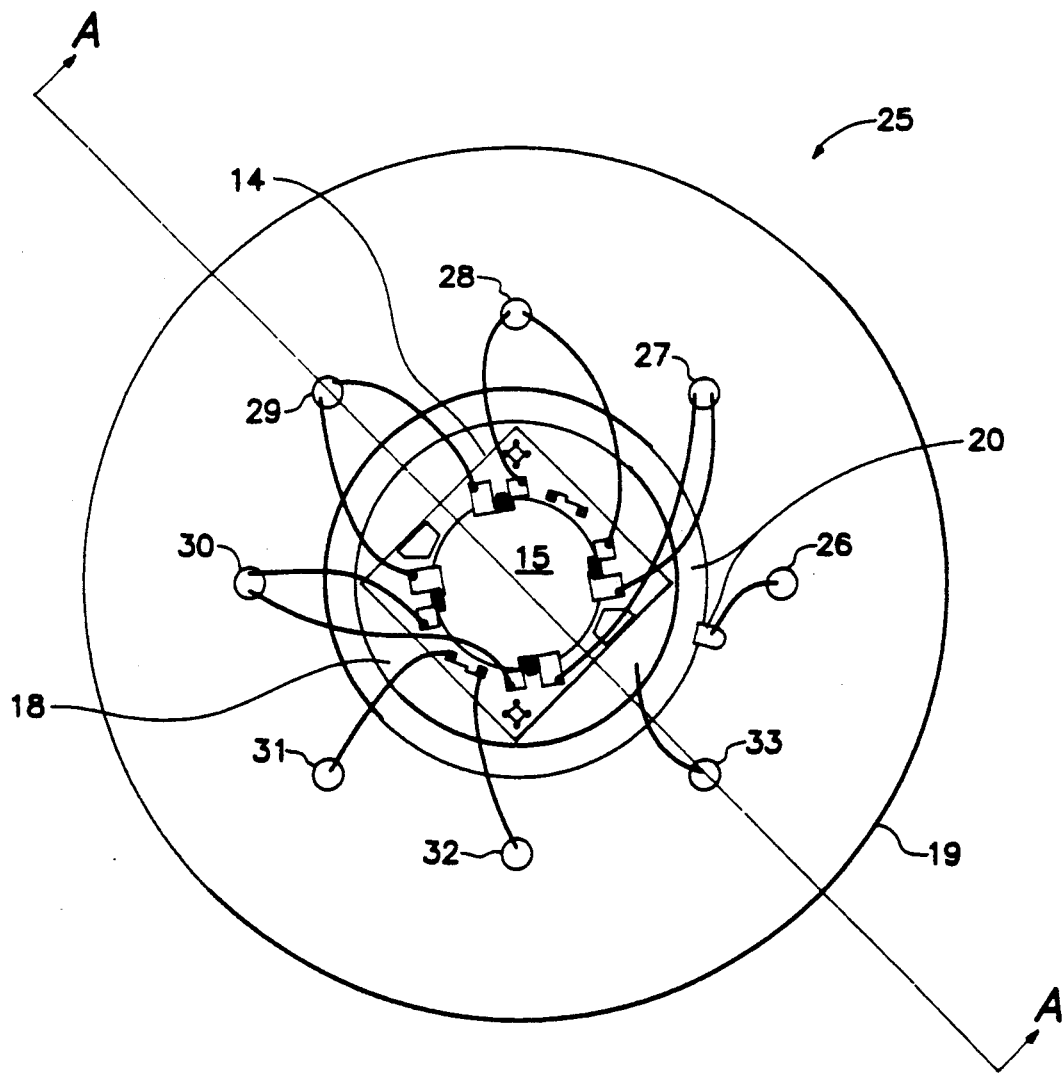
FIG. 2 is a top view of the pressure sensor.
Figure 3:
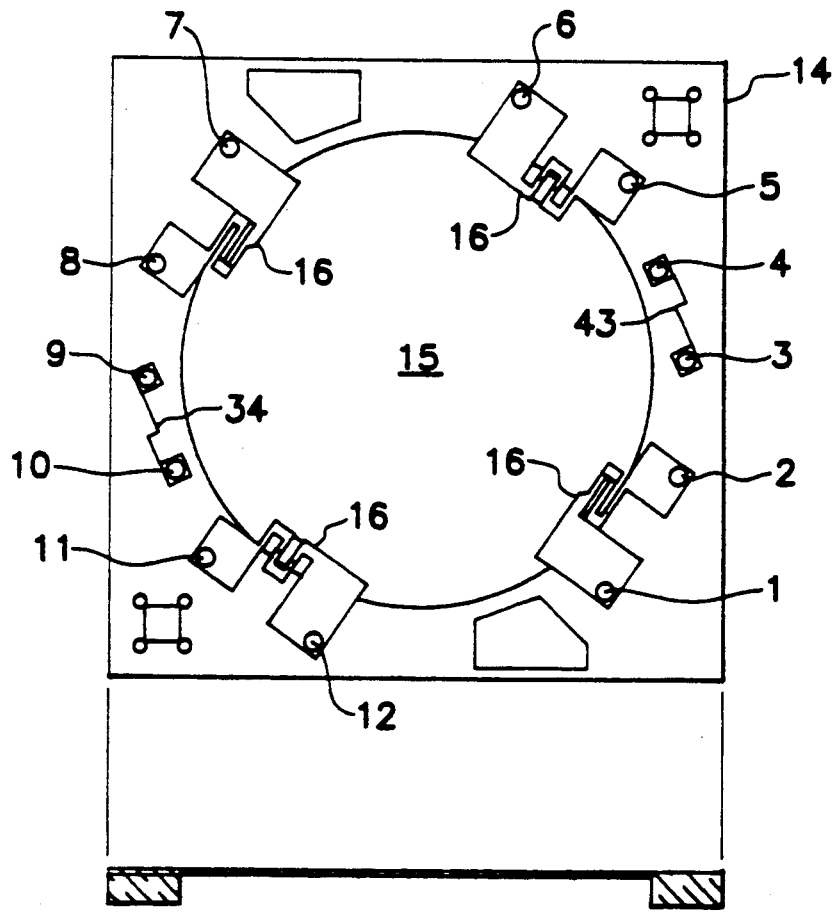
FIG. 3 shows the diaphragm chip of the sensor.
Figure 4:
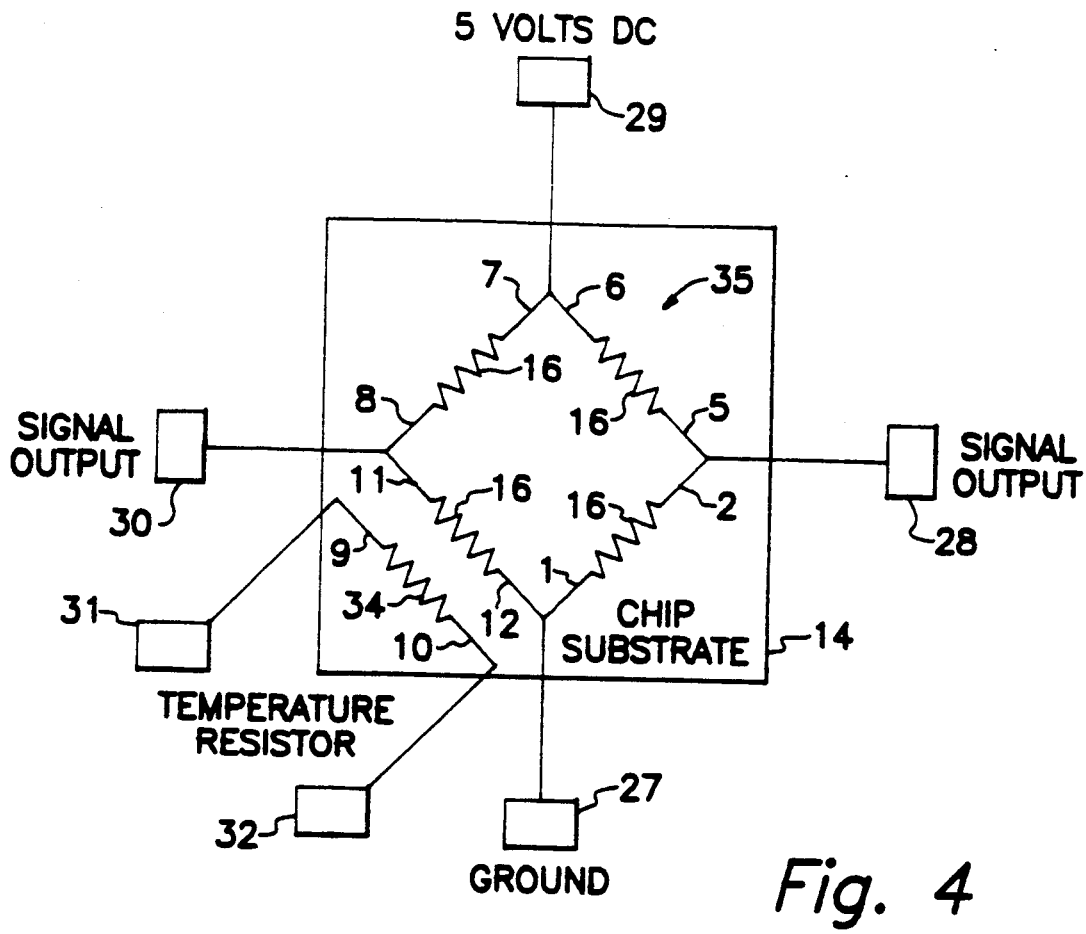
FIG. 4 is a schematic of the circuitry on the diaphragm chip.
Figure 5:
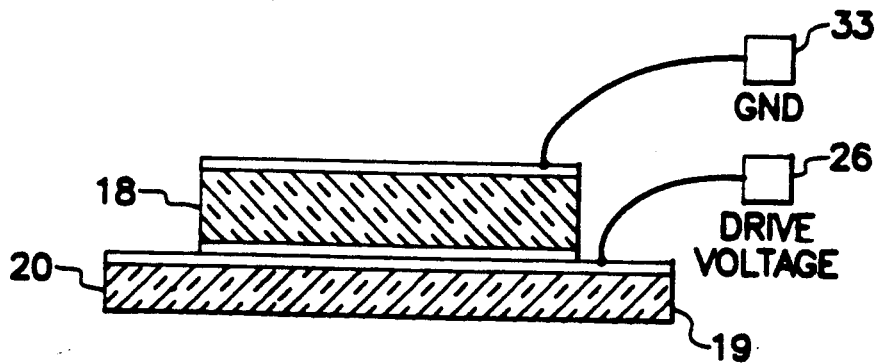
FIG. 5 is a side-view of the piezoelectric ceramic and its connections.

External connections to sensor 25 are made via electrodes 26-33 (FIGS. 2, 4 and 5). Electrode or header 26 provides the drive voltage to PZT 18. Electrode or header 33 provides a ground to PZT 18. Electrode or header 27 is a ground for chip 14 connections 1 and 12 of resistors 16. Electrode or header 28 is a signal output from chip connections 2 and 5 of resistors 16. Electrode or header 29 provides a 5 volts D.C. to chip connections 6 and 7 of resistors 16. Electrode or header 30 is a signal output from chip connections 8 and 11 of resistors 16. Electrodes or headers 31 and 32 are connected to temperature resistor 34. Resistor 34, having chip connections 9 and 10 connected to headers 31 and 32, respectively, indicates the temperature of chip 14 so that the signal outputs from resistors 16 can be compensated for temperature variations. Resistor 43, having chip connections 3 and 4, is a spare chip temperature sensor. Resistors 16 are connected as a Wheatstone bridge 35 (FIG. 4) wherein resistors 16 sense the strain of diaphragm 15 and result in an output variation at headers 28 and 30.

Figure 6:
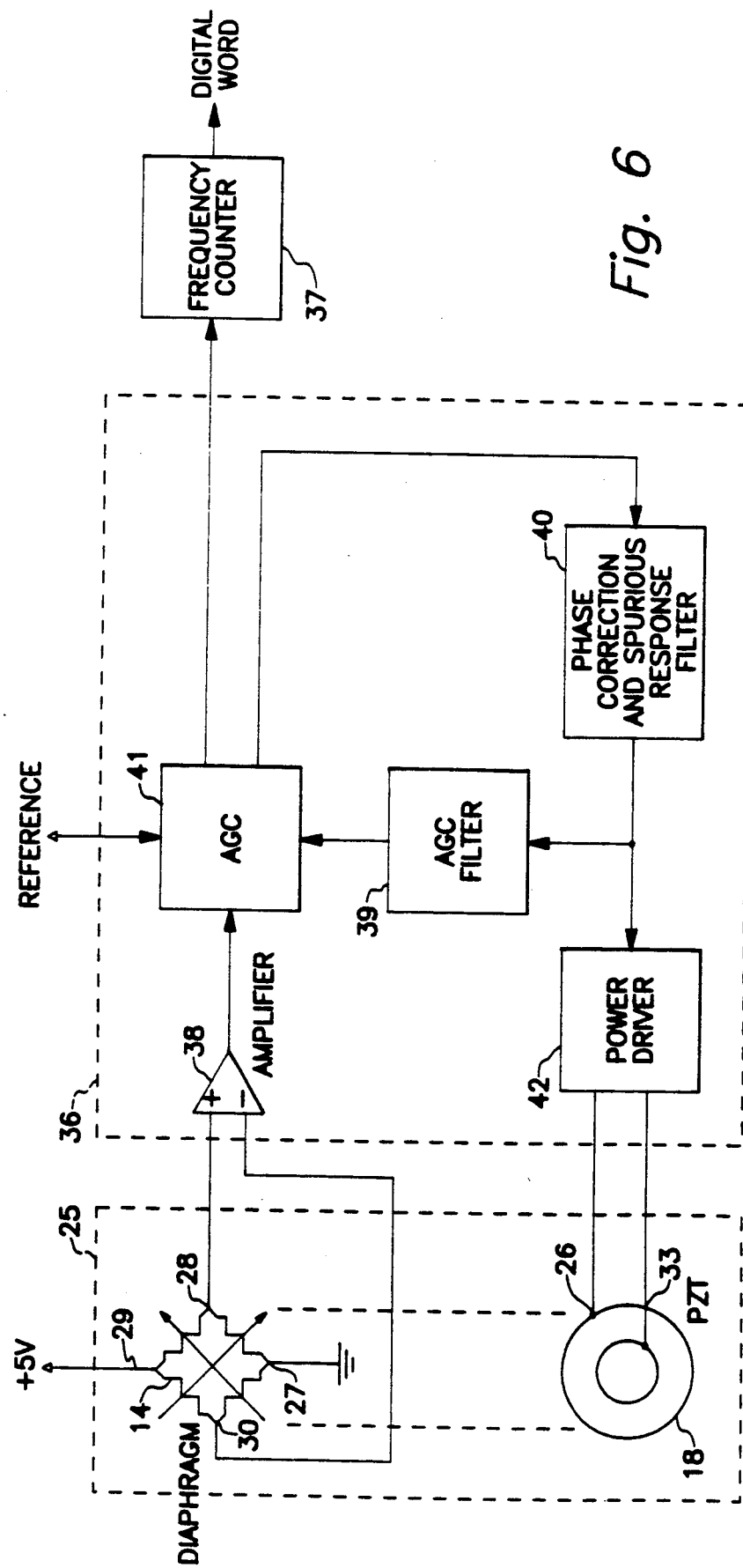
FIG. 6 is a block diagram of the sensor system.

FIG. 6 reveals the supporting electronics of the invention. Bridge 35 is excited with a D.C. voltage. Functionally, when ultrasonic transducer 18 is excited by an AC signal, bulk acoustic waves (longitudinal) are propagated through backplate 17 to chip 14. If the frequency of the excitation to PZT 18 approaches the resonant frequency of diaphragm 15, a strong signal is detected at the outputs of bridge 35. At peak output amplitude, the output voltage has a frequency that is very close to the mechanical resonant frequency of diaphragm 15. Amplifier 36 having the proper phasing closes the loop thereby forming an oscillator circuit. The circuit provides an output frequency to frequency counter 37 that is variable with the pressure load on diaphragm 15 from 48,000 hertz at zero pressure to 58,000 at one atmosphere. This frequency is converted to a digital signal by counter 37 which may be used to provide a digital word or output for such items as air data or engine pressure computations.

Amplifier 36 consists of operational amplifier 38 having inputs connected to terminals 28 and 30 of sensor 25. The output of amplifier 38 is connected to automatic gain control (AGC) 41. AGC 41 controls the magnitude of the signal in the feedback loop sufficiently to reinforce or maintain oscillations of diaphragm 15. AGC 41 output goes to frequency counter 37 and phase correction and spurious response filter 40. Filter 40 removes small delays and ensures that the phase shift of the feedback loop of the oscillator circuit is zero for positive feedback to diaphragm 15 via power driver 42 and PZT 18. Also, filter 40 removes deep spurious resonances of diaphragm 15 thereby preventing interaction of such resonances with the utilized resonance of diaphragm 15. The output of filter 40 is fed back to AGC 41 via AGC filter 39. Additionally, the output of filter 40 goes to power driver 42. Power driver 42 is a buffer that drives PZT 18 which in turn reinforces and sustains the oscillations of diaphragm 15. Frequency counter 37 determines the frequency which translates into the amount of pressure that sensor 25 is sensing.

Figure 7:
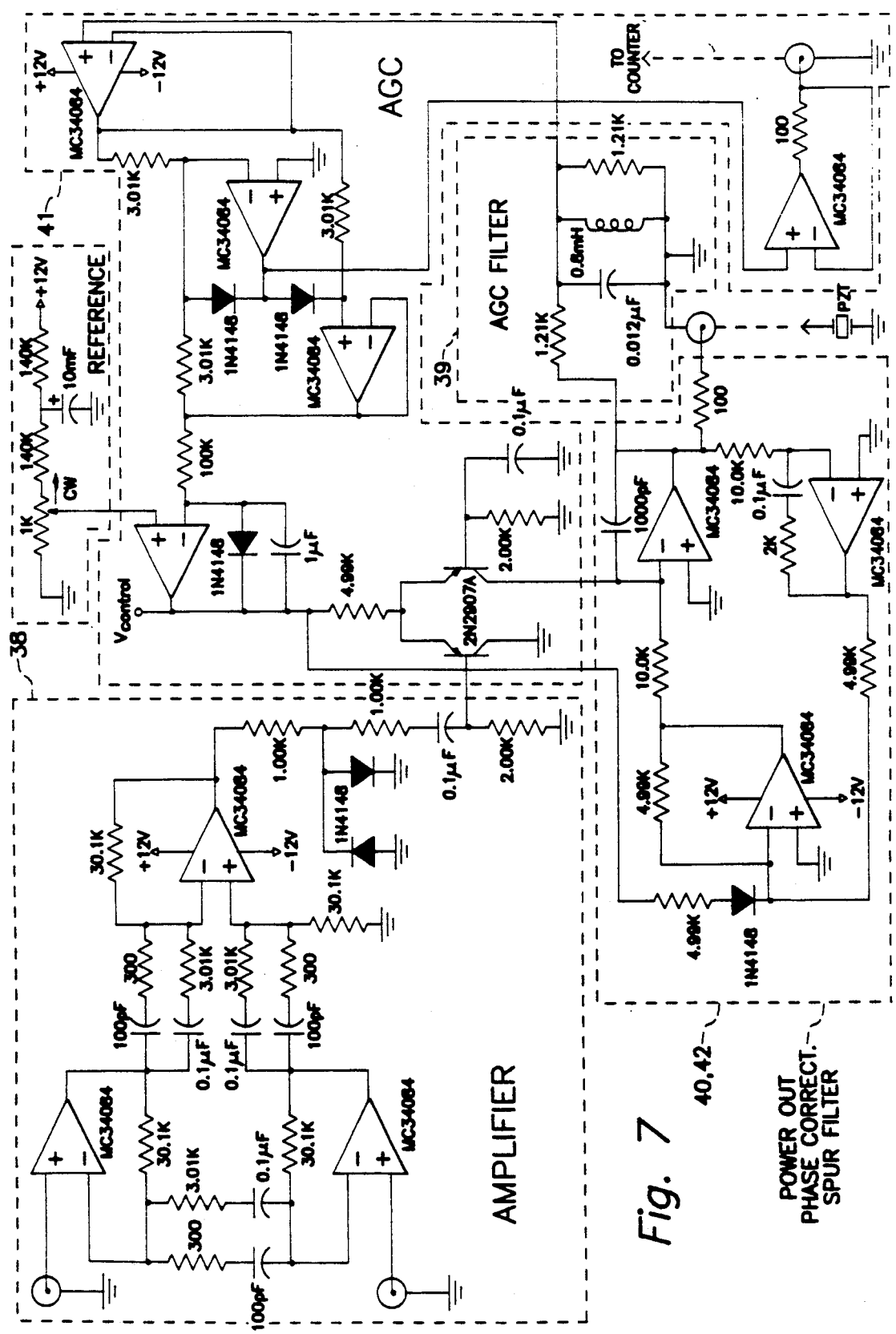
FIG. 7 is a schematic of supporting electronics.

FIG. 7 provides circuit details for amplifier 38, AGC 41, AGC filter 39, filter 40 and driver 42.

What is claimed is:

1. A semiconductor pressure sensor comprising:
   a header having a pressure port;
   a piezoelectric device, having a center port, attached to said header at an end of the pressure port;
   a back plate, having an orifice, attached to said piezoelectric device;
   a diaphragm chip attached to said plate; and
   a cover attached to said header, thereby completing an enclosure of said piezoelectric device, back plate and diaphragm chip in a volume bordered by said header, pressure conducting film and said cover.

2. Sensor of claim 1 wherein:
   said diaphragm chip comprises:
      a diaphragm having variable displacement responsive to pressure change; and
      a plurality of resistors which vary in value upon a variation in displacement of said diaphragm; and
   the pressure port of said, header conveys the ambient an electrically to and on through the center port of said piezoelectric device and through the orifice of said back plate to said diaphragm.

3. Sensor of claim 2 wherein:
   said diaphragm has a fundamental resonant frequency that varies in proportion to the ambient pressure from the orifice of said back plate; and
   said piezoelectric device is a frequency transducer for reinforcing oscillations of said diaphragm at the fundamental resonant frequency.

4. Sensor of claim 3 further comprising supporting electronics means, connected to the plurality of resistors and to said piezoelectric device, for detecting variations in value of said plurality of resistors, determining the fundamental resonant frequency of said diaphragm from the variations and providing a feedback signal to said piezoelectric device.

5. Sensor of claim 4 wherein said supporting electronic means provides an indication of pressure in the pressure port, from the fundamental resonant frequency of said diaphragm.

6. Sensor of claim 5 wherein:
   said back plate, said piezoelectric device, said header and said diaphragm chip have similar thermal expansion coefficients; and
   said diaphragm chip further comprises a temperature sensing means, connected to said supporting electronics means, for providing temperature compensating signals to said supporting electronics means.

7. Sensor of claim 6 wherein the volume has a pressure less than the ambient pressure.

8. Sensor of claim 7 wherein:
   said diaphragm chip is silicon; and the fundamental resonant frequency is ultrasonic.

9. Sensor of claim 8 wherein said supporting electronics comprises:
   an amplifier connected to said plurality of resistors;
   an automatic gain control connected to said amplifier;
   a frequency counter connected to said automatic gain control;
   a first filter connected to said automatic gain control;
   a second filter connected to said automatic gain control;
   a phase corrector connected to said first and second filters, and to said automatic gain control; and
   a signal driver connected to said phase corrector and to said piezoelectric device.

10. A semiconductor pressure sensor comprising:
    a monolithic semiconductor chip having a diaphragm that vibrates at a resonant frequency which changes due to a variable displacement of said diaphragm, the displacement being varied in response to a direct application of an ambient pressure to said diaphragm, and having impedance means for indicating the displacement of said diaphragm;
    transducer means situated in proximity of said monolithic semiconductor chip for sustaining vibration of said diaphragm;
    detector means, connected to said impedance means, for detecting the resonant frequency of said diaphragm; and
    supporting electronics means, connected to said transducer means and to said detector means, for converting the resonant frequency of said diaphragm into a measurement of the ambient pressure upon said diaphragm and for providing a feedback signal to drive said transducer means.

11. Semiconductor pressure sensor of claim 10 wherein:
    said impedance means comprises at least one resistor implanted in said monolithic semiconductor chip wherein the at least one resistor varies in value in response to a variation of the displacement of said diaphragm; and
    said diaphragm has a diameter between about 10 and 200 mils and has a thickness between about 0.1 and 2 mils.

* * * * *